US010816221B2

(12) United States Patent
Descloux (10) Patent No.: US 10,816,221 B2
(45) Date of Patent: Oct. 27, 2020

(54) METHOD FOR TREATING DOMESTIC WATER SUPPLY INSTALLATIONS

(71) Applicant: DIPAN S.A., Nyon (CH)

(72) Inventor: Pierre Descloux, Chambésy (CH)

(73) Assignee: DIPAN S.A., Nyon (CH)

( * ) Notice: Subject to any disclaimer, the term of this patent is extended or adjusted under 35 U.S.C. 154(b) by 0 days.

(21) Appl. No.: 16/093,770

(22) PCT Filed: Apr. 4, 2017

(86) PCT No.: PCT/EP2017/058042
§ 371 (c)(1),
(2) Date: Oct. 15, 2018

(87) PCT Pub. No.: WO2017/178290
PCT Pub. Date: Oct. 19, 2017

(65) Prior Publication Data
US 2019/0128541 A1 May 2, 2019

(30) Foreign Application Priority Data
Apr. 15, 2016 (EP) ..................................... 16165632

(51) Int. Cl.
*F24D 19/00* (2006.01)
*C02F 5/08* (2006.01)
(Continued)

(52) U.S. Cl.
CPC ......... *F24D 19/0092* (2013.01); *B05D 7/222* (2013.01); *B05D 7/225* (2013.01);
(Continued)

(58) Field of Classification Search
CPC .. F24D 19/0092; C02F 5/083; C02F 2103/02; C02F 2303/08; C02F 2209/40;
(Continued)

(56) References Cited

U.S. PATENT DOCUMENTS 5,236,600 A 8/1993 Hutchins
7,858,149 B2 * 12/2010 Gillanders ........... B05D 3/0406
(Continued)

FOREIGN PATENT DOCUMENTS

EP 1432534 7/2008
GB 847981 9/1960
JP H0698355 B2 * 12/1994

OTHER PUBLICATIONS

International Search Report issued by the International Searching Authority, dated Jun. 2, 2017, for International Patent Application No. PCT/EP2017/058042; 3 pages.
(Continued)

*Primary Examiner* — William P Fletcher, III
(74) *Attorney, Agent, or Firm* — Faegre Drinker Biddle & Reath LLP (57) ABSTRACT

A method for treating a domestic supply water circuit, that comprises injecting a treatment product comprising silicates into the water flowing in said circuit in order to form a film on the inner surfaces of said circuit, characterised in that the injection of the treatment product comprises at least one step of injecting silicates at a concentration of between 100 and 200,000 milligrams per litre (mg/L) into the water flowing in said circuit for a period of between 10 minutes (min) and 24 hours (h), the flow rate of water flowing in the circuit being controlled within a range of between 0.05 and 100 litres per minute (L/min) and the temperature of water flowing in the circuit being controlled within a range of between 40 and 65° C.

17 Claims, 4 Drawing Sheets (51) Int. Cl.
*C23F 11/18* (2006.01)
*C02F 1/68* (2006.01)
*B05D 7/22* (2006.01)
*C02F 1/02* (2006.01)
*C02F 103/02* (2006.01)

(52) U.S. Cl.
CPC ............... *C02F 1/68* (2013.01); *C02F 5/083* (2013.01); *C23F 11/182* (2013.01); *C02F 1/02* (2013.01); *C02F 2103/02* (2013.01); *C02F 2209/40* (2013.01); *C02F 2303/08* (2013.01); *C02F 2303/14* (2013.01); *C02F 2303/22* (2013.01)

(58) Field of Classification Search
CPC .... C02F 2303/14; C02F 2303/22; C02F 1/68; C02F 1/02; C23F 11/182; B05D 7/22; B05D 7/222; B05D 7/225
See application file for complete search history.

(56) References Cited

U.S. PATENT DOCUMENTS

2004/0238450 A1* 12/2004 Descloux ............... B08B 9/032
210/696
2017/0120311 A1* 5/2017 Timmons ................. C02F 5/00

OTHER PUBLICATIONS

English translation of the International Searching Authority issued by the International Searching Authority, dated Jun. 2, 2017, for International Patent Application No. PCT/EP2017/058042; 2 pages.
Written Opinion of the International Searching Authority, dated Jun. 2, 2017, for International Patent Application No. PCT/EP2017/058042; 3 pages.

* cited by examiner

METHOD FOR TREATING DOMESTIC WATER SUPPLY INSTALLATIONS

This application claims priority to PCT Application Number PCT/EP2017/058042 filed Apr. 4, 2017, which in turn claims priority from European Patent Application Number 16165632.7 filed Apr. 15, 2016, the subject matter of which are incorporated herein by reference.

The present invention concerns a method for treating the inner surface of sanitary water installation pipes.

A method for preventive treatment of corrosion, oxidation and deposits in sanitary water circuits by injecting silicates is known from EP1,432,534B1. Sodium silicate solutions are injected into sanitary water systems to limit corrosion inside the pipes. The injection is carried out while the sanitary water system is in operation, continuously and in an amount proportional to the water flow rate, although at concentrations that guarantee compliance with food standards. The presence of silicates in the water slows corrosion by forming a thin protective film deposited on the inner surfaces of the pipes. The presence of this protective film limits chemical exchanges between the water and the pipe. This method is effective for treating all materials susceptible to corrosion phenomena, particularly ferrous alloys and copper alloys.

In general, a diagnosis is first made in order to provide a description of the condition of the water system to be treated. This diagnosis defines the level of degradation of the pipes. Depending on the pipes' condition, it may be useful to clean them, particularly to remove oxidation and scale deposits which can clog the pipe, degrade water quality, accelerate degradation of the pipes by their presence (especially in the case of crevice corrosion) and risk impeding proper film formation during the treatment step.

A known method for cleaning pipes is injection of acids to dissolve deposits inside the pipes. This approach has the advantage of being simple to use and effective. However, in the case of relatively advanced corrosion, there may be local micro-perforations of the pipes due to pitting corrosion in the case of copper, or crevice corrosion in the case of ferrous alloys. These micro-perforations are often blocked by oxidation and scale deposits themselves, thus producing no leaks. In these situations, acid cleaning dissolves these small "plugs" and micro-leaks appear.

One approach to remedy this problem would be to identify the affected pipe sections and to replace or sleeve the failed components. Nevertheless, this represents an extremely long and complex operation both to identify the position of the leak (because the pipes are often inside walls and the leakage rate is low) and to repair it.

Another problem related to chemical cleaning is the phenomenon of colouring (red water, turbidity) of the water when the system is returned to operation. In spite of the neutralisation of the cleaning products and the rinsing carried out after the cleaning, the presence of coloured water, resulting from very rapid reactivation of oxidation inside the pipe stripped by the cleaning, is sometimes observed.

Once the pipe has been cleaned, it can then be treated to prevent corrosion by continuous injection of silicates. The silicate concentration must comply with the legal food standards in force in various countries. For silicates in drinking water in Switzerland, the Swiss foodstuffs manual (MSDA) and the federal regulations on foreign substances (OSEC) propose a tolerance value for added silicates (for purposes of protecting against corrosion) of 5 milligrams of silicon per litre of water (mg Si/L water) in regular treatment and 10 mg Si/L water in the short term (not exceeding 3 months). Although food standards are not the same in all countries, the practice in Switzerland is considered a safe practice for human health and may serve as a reference. At these concentrations, the rate at which the silicate film forms may be too slow to form a sufficient protective layer to remedy the above-mentioned problems.

Furthermore, the rate of formation of the above-mentioned layer is difficult to control and depends on various parameters, particularly:
- the amount of water consumed;
- the flow rate and velocity;
- the temperature—the deposition yield being lower in cold water than in hot water;
- and what we shall call environmental parameters, such as the composition of the water, particularly its pH and hardness, the component materials of the pipe and other phenomena such as the presence of stray currents. The environmental parameters thus include all the factors having an influence on the above-mentioned layer formation, but which cannot be controlled by the present invention.

A rough surface condition of a degraded pipe can also disturb the deposition of an adequate protective film, for example due to local disturbances of water flow.

A continuous treatment as proposed in patent EP1,432,534B1 may not be sufficient to remove or to reduce sufficiently certain micropollutants or pathogens that may migrate from sanitary water pipes to drinking water. The possible sources of these micropollutants and pathogenic germs are the various components of the pipes, namely:
- The pipes themselves.
- The welds and joints related to the assembly of the pipes.
- The various equipment necessary for the proper functioning of a hydraulic system such as valves, taps or flow meters.

Undesirable micropollutants include, but are not limited to:
- Lead, which can come from various components, such as lead pipes, tin-lead solder, brass fittings and PVC pipes.
- Cadmium, chromium and nickel, which can come from low-alloy copper components.
- Zinc, which can come from galvanised steel components.
- Vinyl chlorides, which can come from PVC pipes.
- Benzopyrenes, which can come from polyethylene pipes.
- Certain pathogenic germs, such as *Legionella*, like to grow on the inner surface of pipes as well as in many nooks and crannies.

A general aim of the invention is to provide a method for treating the inner surface of sanitary water installation pipes in order to ensure good water quality and/or to provide good protection against pipe degradation.

It is advantageous to provide a method that provides good protection against corrosion and deposit formation.

It is advantageous to provide a method that limits the contamination of sanitary water by pollutants and pathogens present in water circuits.

It is advantageous to provide a method that repairs micro-leaks.

It is advantageous to provide a method that quickly prevents the formation of corrosion after cleaning a sanitary water installation.

It is advantageous to provide a method that increases the reliability and efficiency of a continuous, food standards-compliant silicate-injection treatment for preventing corrosion and/or deposit formation in sanitary water circuits.

The present invention discloses a method for treating a sanitary water circuit, comprising injecting a treatment product comprising silicates into the water circulating in said circuit in order to form a film on the inner surfaces. The injecting of the treatment product comprises at least one step of injecting silicates at a concentration of between 100 and 200,000 milligrams of silicon per litre of water (mg Si/L water) into the water circulating in said circuit for a period of less than 48 hours (h), the circulating water flow rate in the circuit being adjusted in a range between 0.05 and 100 litres per minute (L/min) and the circulating water temperature in the circuit being adjusted in a range between 35 and 65° C.

Advantageously, the rapid impregnation of silicates on the inner surface of the pipe provides a resistant and reliable layer over the entire inner surface and seals any microperforations. This impregnation layer also serves as an excellent base for continuous treatment that feeds this base layer in order to maintain long-lasting protection. Also, the rapid formation of an optimal layer:

limits the migration of micropollutants from pipes, welds and pipe fittings to drinking water, and prevents/limits contamination of drinking water by pathogenic germs growing in pipes.

The method according to the invention allowing the almost immediate formation of a protective film, which thus prevents contact between the water and the pipe, is very effective in limiting the migration of micropollutants towards drinking water. Furthermore, the rapid formation of a film on the inner surface of the pipes, plugging small cavities and reducing surface roughness, limits the development of these germs by:

filling cavities (the areas in which germs develop are sealed)

trapping pathogens (existing germs can be covered by the film).

According to an embodiment, the silicate concentration in the water circulating in said circuit is adjusted between 500 and 50,000 mg/L, preferably between 1,000 and 20,000 mg Si/L water.

According to an embodiment, the injection step lasts between 30 minutes and 12 hours, preferably between 1 hour and 4 hours, for example around 2 hours.

According to an embodiment, the circulating water flow rate in the circuit is adjusted in a range between 0.05 and 10 L/min.

According to an embodiment, the circulating water temperature in the circuit is adjusted in a range between 40 and 60° C., preferably between 50 and 60° C., for example around 55° C. Advantageously, the adjustment of the temperature in these ranges allows the silicate layer to form faster and makes it more homogeneous.

According to an advantageous embodiment, the method comprises at least two treatment product injection cycles, preferably at least three treatment product injection cycles. Advantageously, the plurality of cycles improves the resistance of the silicate layer by improving crystallisation via successive thin layers.

According to an advantageous embodiment, the method comprises at least one drying step consisting of emptying the water circuit for a period of between 5 minutes and 2 hours, after at least one of the treatment product injection cycles. Drying advantageously increases the resistance of the silicate layer formed on the inner surface of the pipes.

According to an embodiment, a drying step is performed after each treatment product injection step.

According to an embodiment, a drying step lasts between 10 minutes and 1 hour, preferably between 20 minutes and 40 minutes, for example around 30 minutes.

According to an embodiment, the sanitary water circuit comprises a cold water circuit, and the method comprises a step of interconnecting the cold water circuit with a hot water supply configured to circulate hot water in the cold water circuit during injection of the treatment product. This advantageously makes it possible to optimise the impregnation process for cold water circuits.

According to an embodiment, the sanitary water circuit comprises a cold water circuit and a hot water circuit, and the method comprises a step of interconnecting the cold water circuit with the hot water circuit configured to circulate hot water in the cold water circuit during injection of the treatment product. This makes it possible to optimise the impregnation process for the cold water circuits in an economical way, since the hot water and cold water circuits are treated simultaneously.

According to an embodiment, the hot water supply may be a supply external to the system.

According to an embodiment, the silicates are in the form of sodium silicates in solution, notably comprising mainly $(Na_2O)_n + SiO_2$, n being from 1.6 to 3.8.

According to an embodiment, the method may include a step of cleaning the sanitary water circuit before injecting the treatment product comprising silicates, the cleaning step comprising injecting acid into the sanitary water circuit.

According to an embodiment, after the one-time treatment steps mentioned above, the treatment product comprising silicates may be injected continuously in an amount proportional to the volume of water entering the sanitary water circulation circuit, the maximum amount of product injected not exceeding a value set by food standards.

Other advantageous aims and aspects of the invention will become apparent from reading the detailed description of embodiments and the drawings.

Referring to the figures, a method for treating a sanitary water circuit comprises injecting a treatment product comprising silicates into the water circulating in said circuit in order to form a film on the inner surfaces of said circuit. This treatment method may be preceded by a step S0 of diagnosing the condition of the pipes of the sanitary water system and, depending on the results, by a decision on the processes to be carried out as illustrated in FIG. 1.

Figure 2:
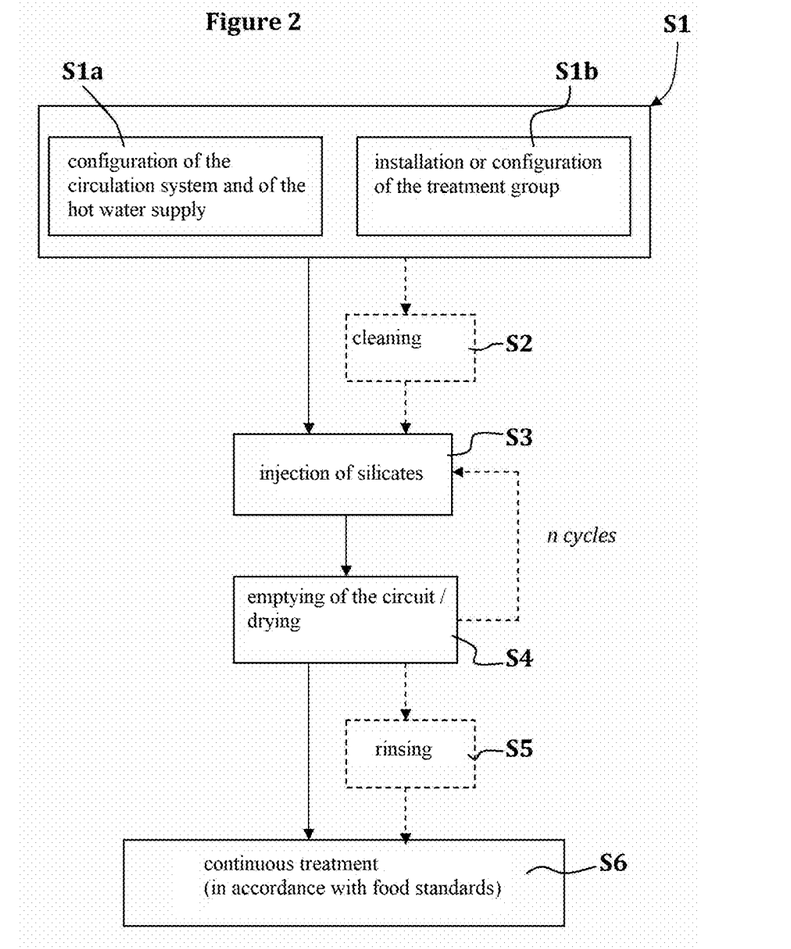
FIG. 2 is a diagram illustrating a method for treating a sanitary water installation according to an embodiment of the invention.

Referring to FIG. 2, a first step S1 comprises preparing the treatment installation and configuring the sanitary water system for the impregnation process S3, S4. The configuration of the system may notably comprise interconnecting a cold water circuit with an external water heater and/or interconnecting a cold water circuit with a hot water circuit of the sanitary water system of a building or part of a building, so that the temperature of the cold water circuit can be increased to an optimal temperature for the impregnation process. The temperature may be adjusted by controlling the mixture (flow rate) of hot water and of cold water injected into the circuit under treatment during the impregnation process. Various means for automatically adjusting the flow of inlet hot and cold water in order to stabilise the outlet temperature, well known per se, may be used in the treatment installation to adjust the treatment temperature.

The treatment method according to the invention comprises a silicate film impregnation process S3, S4 which is carried out when the water system is not in normal operation. The impregnation process S3, S4 is a one-time event preferably carried out in under 12 h in order to limit the shutdown of the sanitary water system. The treatment method may also comprise, after the impregnation process S2, a process S6 of continuous injection of the treatment product comprising silicates in an amount proportional to the volume of water entering the sanitary water circuit, the maximum amount of product injected not exceeding a value set by food standards. Before impregnation, the treatment method may further comprise a process S2 for cleaning the sanitary water circuit. The cleaning step may notably comprise injecting acid into the sanitary water circuit.

Figure 1:
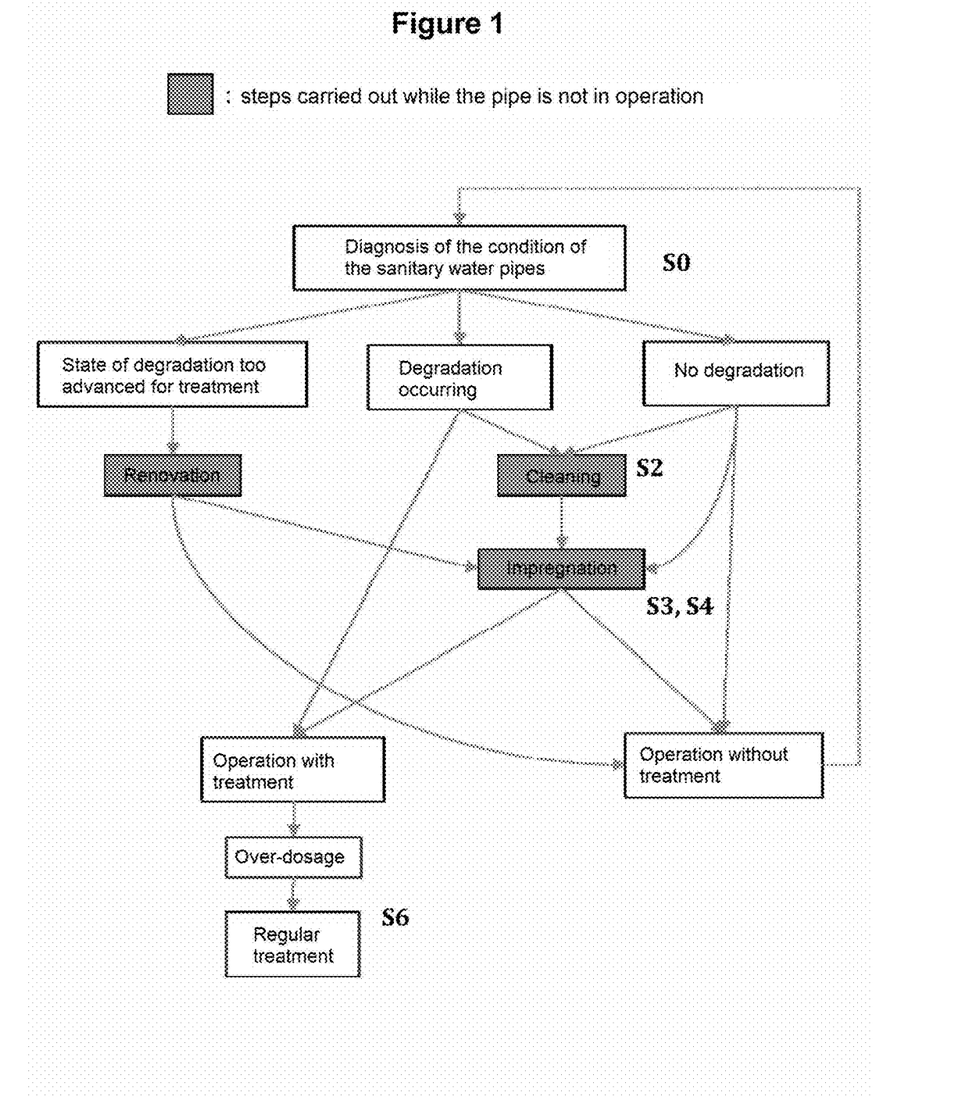
FIG. 1 is a diagram illustrating in an overall way a method for diagnosing and treating sanitary water installations according to an embodiment of the invention.

The positioning of the impregnation process S3, S4 is shown in FIGS. 1 and 2. It is performed:

- In general, after a cleaning process S2, but also at any other time in the life of a sanitary water system, for example, in the case of preventive treatment on a portion of a new circuit.
- In general, prior to operation with continuous, food standards-compliant treatment S6, but also sometimes prior to operation without treatment, such as, for example, in the case of a pipe in good condition undergoing cleaning due to scale, and where impregnation is applied to avoid problems of coloured water.

Unlike the later steps of over-dosage and of continuous treatment S6, the sanitary water system is not in operation during the impregnation process S3, S4. This makes it possible to apply various silicate injection procedures as well as to use different physical and chemical silicate injection parameter values which greatly facilitate formation of the protective film.

This process is also ideally composed of an alternation of two steps:

- A step S3 of injecting a silicate solution into the pipes at a concentration exceeding food standards and at temperatures varying between 35 and 65° C., preferably between 40 and 60° C. The purpose of this injection period is to deposit a silicate layer rapidly.
- A step S4 of drying the protective film, the objective of which is to harden and stabilise the layer by desiccation. This step enhances the resistance of the protective film, but it is not essential, and the impregnation process may also be carried out by an injection step alone.

Figure 3:
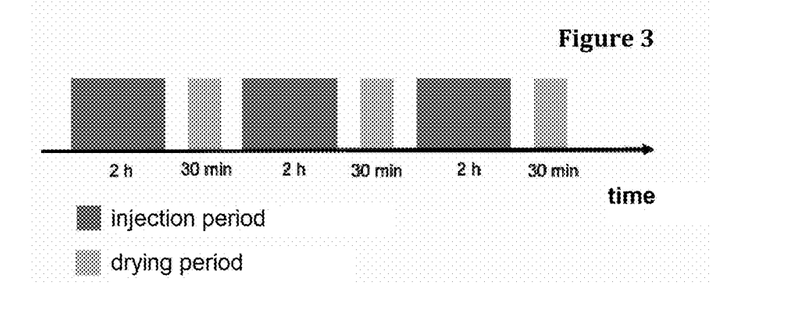
FIG. 3 is a graph illustrating the treatment steps as a function of time of a portion of the method according to an embodiment of the invention.

Ideally, the impregnation procedure comprises a plurality n of cycles, notably at least two cycles, but preferably three cycles, or more. Each cycle comprises an injection step S3 which may be followed by a drying step S4, or simply by a waiting period without emptying the water circuits. The drying step may be performed by emptying the water circuit and allowing air to enter the circuit, followed by a waiting period that may be between 5 minutes and 4 hours, but is preferably between 10 minutes and 1 hour, for example between 20 and 40 minutes. In the example shown in FIG. 3, there are three injection cycles of about 2 hours each, and three drying cycles of about 30 minutes each.

In a variant, one or more of the drying steps may comprise a forced blowing of air, or of a gas that promotes drying of the layer of treatment product, into the circuit under treatment. The forced blowing may be carried out, for example, by means of an air compressor or by means a cylinder of compressed gas.

The adjustable parameters of the injection process S3 are as follows: number of cycles, injection phase duration, silicate concentration (calculated in mg Si/L water), water flow rate and injection temperature. The table below suggests operational values for these various parameters.

TABLE 1

Values of the various parameters involved in the injection phase

| | Advantageous example | Preferential range | Possible range |
| --- | --- | --- | --- |
| Number of cycles (—) | 3 | 2-10 | 1-50 |
| Injection duration (h, min) | 2 h | 30 min to 12 h | 10 min to 24 h |
| Si concentration (mg Si/L water) | 5,000 mg/L | 500 to 50,000 mg/L | 100 to 200,000 mg/L |
| Water flow rate (L/min) | 0.3 L/min | 0.05 to 10 L/min | 0.05 to 100 L/min |
| Injection temperature (° C.) | 55° C. | 50 to 60° C. | 35-65° C. |

The amount of silicates injected can be defined by the relationship:

$$M_i = C_i * Q * t \quad (1)$$

Where Ci is the inlet water silicate concentration (g/L)
Q is the water flow rate (L/sec)
t is the injection duration (sec)

The "deposition yield" is very sensitive to many parameters. Indeed, a silicate deposition yield can be defined by:

$$\mu = \frac{M_d}{M_i} \quad (2)$$

Where Md is the mass of silicate deposited (g)
Mi is the mass of silicate injected (g)

This yield is particularly sensitive to temperature, but also to silicate concentration, injection duration, flow rate, flow velocity and probably other environmental parameters. In particular, the deposition yield is lower in the case of injection in cold water than in hot water.

The corresponding volume of water to carry out the deposition can be defined by the relationship:

$$Vw = Md/Ci$$

Where Vw is the volume of water (m3)
Md is the mass of silicate deposited (kg)
Ci is the concentration of silicate injected (kg/m3)

This then leads to a relationship establishing the effect of the main parameters (yield, concentration, flow rate and injection time) on the mass of silicates deposited.

$$M_d = \mu * C_i * Q * t \quad (3)$$

It should be noted that the deposition yield itself also depends on these main parameters (concentration, flow rate and injection time) and on environmental parameters, such as pH, hardness, alkalinity, etc., as presented in the following equation:

$$\mu=\mu(C_i,Q,t,\text{par.env.}) \quad (4)$$

The various values proposed in Table 1 are based on the following arguments:

Si Concentrations:
Upper limit of 200,000 mg Si/L water: this is the Si concentration found in silicate solutions comprising sodium silicates, particularly $Na_2SiO_3$. They are in the form of a viscous liquid. This is the saturation limit; at higher concentrations, saturation crystallisation appears.
Optimal values between 1,000 and 20,000 mg Si/L water, particularly between 2,000 and 10,000 for injection pump flow rates typically used in sanitary water installations of buildings. For a maximum flow rate of an injection pump of 6 L/h and a water flow rate of 0.3 L/min, this corresponds to a concentration of 5,000 mg Si/L water.

Injection Temperature:
Lower limit of about 35° C.: temperature has a strong influence on silicate crystallisation. Below this temperature, the efficiency of silicate deposition on the inside walls of pipes becomes too low for an efficient and economical process.
Upper limit of 65° C.: above 65° C., silicates tend to precipitate very quickly, which can cause deposition at the injection site, creating two problems: silicates that precipitated during injection are no longer available for downstream zones and cause an obstruction at the injection site.
Optimal value around 55° C.: this is an attractive compromise between inefficiency and excessively rapid precipitation.

Water Flow Rate:
Lower limit of 0.01 L/min: at low flow rates, it is necessary to compensate by increasing the injection concentration or duration, as can be seen in equation (3).
Upper limit of 100 L/min: the boiler must heat cold water, for example 15° C., to the injection temperature, for example about 55° C. The power consumed by the boiler is proportional to the temperature difference and to the flow rate of water to be heated as shown in relationship (5) below. Therefore, the higher the flow rate, the higher the boiler power must be.

$$\dot{Q}=\dot{m}*c*\Delta T \quad (5)$$

Where Q is the heat output of the water heater (W)
m is the mass flow rate of water (kg/s)
c is the heat capacity of water=4185 (J/kgK)
ΔT is the temperature difference between (K) the water heater outlet and inlet Another aspect limiting water flow is maintenance of the silicate concentration. This aspect can be shown by reversing the relationship (3). An optimal value is around 0.3 L/min, taking into account the constraints described above.

Number of Injection Cycles and Injection Duration:
These two parameters depend mainly on the desired quality of the silicate deposition on the wall, given that the time available is limited (generally 24 h max, even 12 h max) since it is often preferable not to shut down a water system for long periods, and preferably not more than one day.

The adjustable parameters of the injection process, including the duration of an injection step, the temperature, the concentration of the treatment product, the composition of the treatment product, the duration of the treatment cycle and the water flow rate, may be essentially the same from one step to another, or may be different from one step to another. For example:

the duration of one step may be longer, and/or at a lower temperature, and/or at a lower concentration, than another step, or
the duration of one step may be longer, and/or at a lower temperature, and/or at a higher concentration, than another step, etc.

The variation in the parameters may be particularly advantageous between the first injection cycle and the following cycle(s), depending on the condition of the pipes or on the cleaning process carried out before the impregnation process. In order to form a uniform and thin first layer serving as a homogeneous bonding surface to help the uniform growth of a subsequent layer, there may be an advantage to performing the first cycle with a lower concentration of treatment product than the other cycles, but possibly for a longer time and/or at a different temperature. Indeed, as the properties of the inner surface of the pipes before treatment or after cleaning may be highly variable along the sanitary water circuit, particularly the materials and geometric irregularities (bumps, rough edges) on the surface, the rate of film formation on the bare surface of the pipe may be highly variable from one portion of the pipe to another. Slower growth of the first layer may help form a more homogeneous film rather than help rapid growth. Thereafter, for reasons of efficiency and time savings, the growth of the film can be carried out more quickly since the first layer makes the surface properties uniform.

The durations and parameters of the drying cycles may also be essentially identical from one step to another or may be different from one step to another. In particular, it may be advantageous for the duration of the last drying cycle to be longer than the previous ones in order to increase the resistance of the impregnation layer before returning to normal operation, the process being generally more efficient and economical if more drying time is allocated at the end of the impregnation process.

Figure 4:
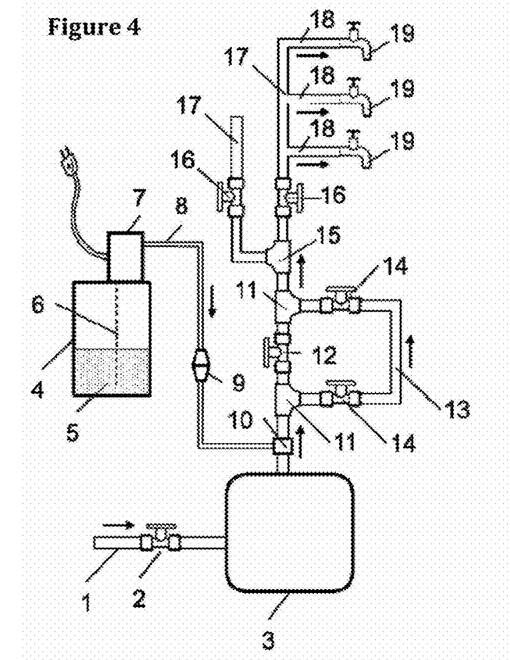
FIG. 4 is a schematic view of a sanitary water installation configured for a treatment method according to a first embodiment of the invention.

Referring to FIG. 4, the treatment of a simple system comprising a hot water or cold water circuit is illustrated. This situation may arise for various reasons:

The building to be treated does not have centralised hot water production but rather individual boilers. The building therefore only has a cold water circuit.
For various reasons (different degree of corrosion, different materials, etc.), it is necessary to treat only the hot water or the cold water.

In this case, the assembly is ideally designed as shown in FIG. 4, illustrating a configuration with the following features:

main line 1 at the building's entrance
valve 2 for stopping the flow in the building
hot water supply 3 (in this example forming part of the hot water circuit of the sanitary installation)—the water is thus heated from the cold water supply temperature (for example 10 to 20° C.) to the impregnation temperature, for example 55° C. The maximum water flow rate is given by the power of the water heater according to the formula (5). Depending on the building's equipment, this hot water production may be:

a. The central boiler of the sanitary hot water circuit may be operated directly to treat the hot water pipes and may be diverted to treat the cold water pipes.
b. If the building does not have a central boiler or its volume or heat capacity is insufficient, the element 3 may be an external hot water supply, for example an auxiliary water heater.

tank 4 containing the silicate-based pipe cleaning product
silicate-based cleaning product 5
suction tube 6 from the cleaning agent to the metering pump
metering pump 7 for injecting silicates into the main line
silicate supply pipe 8
check valve 9
silicate injection point 10 into the water flow
branches 11 for directing the flow into a by-pass
valve 12 for stopping the flow in the main line in order to force it through the by-pass
by-pass control tube 13 which is removable and allows the quality of the silicate film deposition to be evaluated after application of the impregnation treatment
valves 14 for isolating the by-pass from the flow in order to disassemble it for inspection.
branches 15 feeding the various standpipes
valves 16 for isolating or supplying the standpipe(s)
standpipes 17 of a building's sanitary water circuit
branches 18 of the various pipes
taps 19 at the outlet of each pipe.

In the case of several standpipes 17, it is advantageous to separate or isolate them beforehand by means of a valve. This makes it possible to work independently on different circuits of a building's sanitary water installation and to increase treatment efficiency. Note that in this case, the main flow rate can be adjusted by opening the taps. This can be done alternately or in parallel.

Since the water is loaded with silicate, silicate deposits form when it flows into the sinks. It is thus advantageous to attach a flexible hose to the tap outlet to allow the silicate solution to flow directly into the trap at the bottom of the sink.

It should also be noted that for cold water pipes, it is advantageous to carry out a cooling process before the water is turned back on in order to preserve the protective layer in its entirety.

Figure 5:
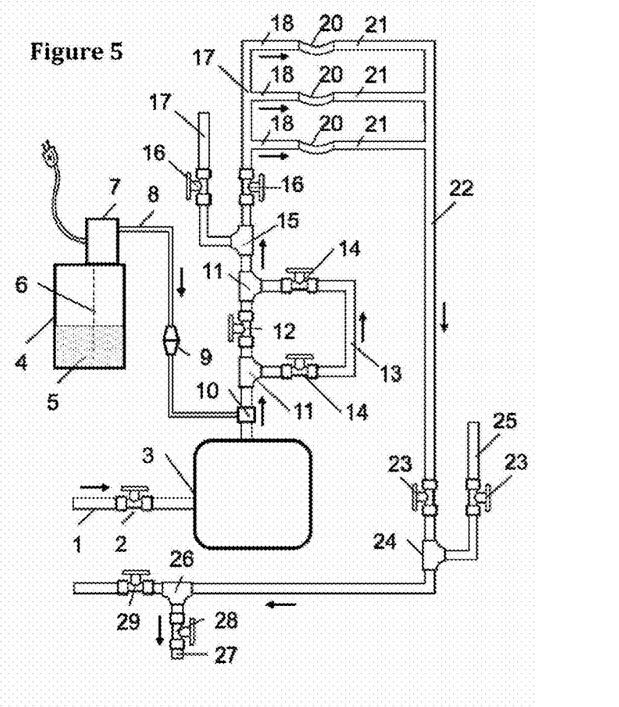
FIG. 5 is a schematic view of a sanitary water installation configured for a treatment method according to a second embodiment of the invention.
Figure 6:
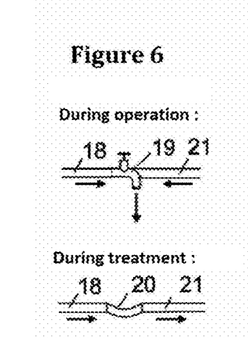
FIG. 6 is a schematic view of a sanitary water installation configured for a treatment method according to a third embodiment of the invention.

Referring to FIG. 5, the treatment of a dual system comprising a hot water circuit and a cold water circuit is illustrated. When it is necessary to treat the hot water circuit and the cold water circuit, one may:
treat the hot water and the cold water circuit alternately according to the procedure presented in relation to FIG. 4;
or proceed more advantageously to reduce working time by connecting the two circuits in series in order to treat them in a single operation as shown in FIG. 6.

This second approach follows the treatment principle shown in FIG. 4, but with a modified configuration having the following additional or modified features:
hot water supply 3 comes from the central boiler and not from an external auxiliary water heater
flexible hoses 20 for connecting the branches 18 of the hot water circuits to the branches 21 of the cold water circuit
cold water standpipe 22
valves 23 for isolating the various cold water standpipes
branches 24 of the various standpipes
cold water standpipes 25
branch 26 for recovering the injected silicate solution
silicate recovery pipe 27
silicate recovery valve 28
isolation valve 29 for the building's cold water supply The taps 19 are removed in order to connect, using a flexible hose 20, the hot water outlet branches 18 and the cold water outlet branches 21. This makes it possible to carry out the impregnation treatment in the hot water circuit 17, 18 and in the cold water circuit 21, 22 in a single injection operation. The silicate solution is then recovered using a branch 26, a valve 28 and a silicate recovery pipe 27.

Figure 7:
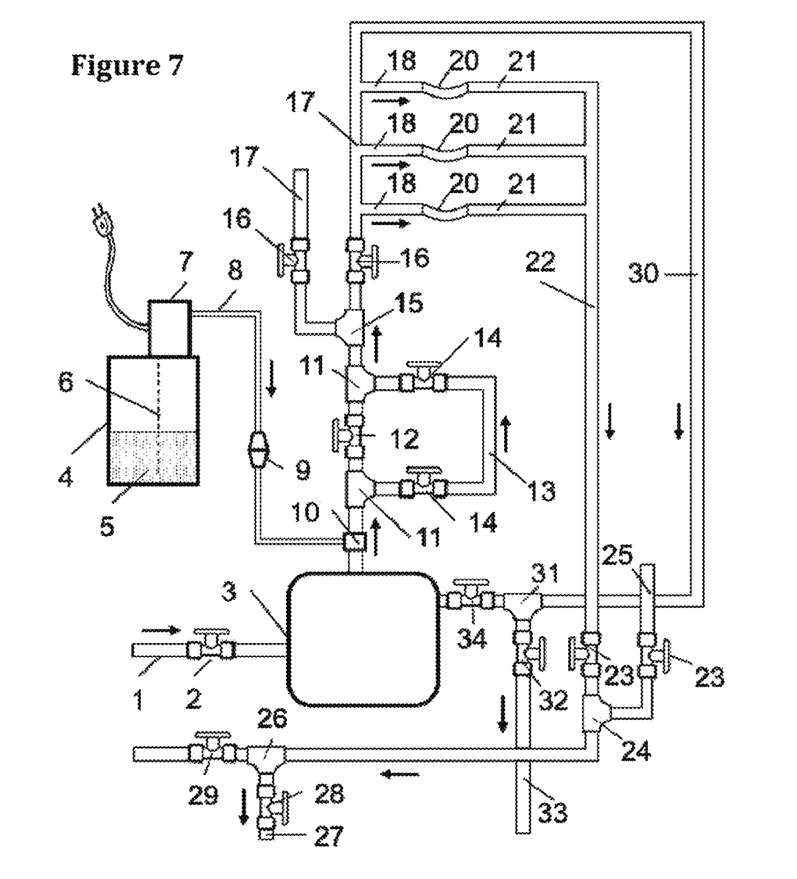
FIG. 7 is a schematic view of a sanitary water installation configured for a treatment method according to a fourth embodiment of the invention.

Referring to FIG. 7, the treatment of a triple system comprising a hot water circuit and a cold water circuit, the hot water circuit having a loop allowing a return hot water circulation to the water heater 3. When it is necessary to treat a triple cold water and hot water system comprising a circulation loop, one may:
proceed according to an approach combining the methods presented in relation to FIGS. 4 and 5
proceed according to an approach for treating the triple system in a single operation as presented below.

The operating diagram is that shown in FIG. 7. It follows the principle of that shown in FIG. 5, but with a modified configuration having the following additional or modified features:
hot water circulation pipe 30 (the circulation pump is not shown in this diagram)
branch 31 for recovering the injected silicate solution from the circulation pipe
silicate recovery pipe 33
silicate recovery valve 32
circulation water inlet isolation valve 34

For this third configuration, in order to carry out the impregnation all at once, the cold water circuit and the circulation circuit may be distributed in parallel, according to a procedure similar to that described in relation to FIG. 5.

When it is necessary to treat only a hot water circuit comprising a circulation circuit, the procedure is similar to that shown in FIG. 7, but without the cold water circuit.

In these diagrams, the direction of flow is always presented from the hot water to the cold water because it is advantageous, the boiler being on the hot water, to avoid having to reconnect the pipes to the boiler. It is nevertheless possible to modify the positions of the inlets and outlets of the treatment solution.

The invention claimed is:

1. A method for treating a sanitary water circuit of a sanitary water system, comprising injecting a treatment product comprising silicates into the water circulating in said circuit in order to form a film on the inner surfaces of said circuit, wherein the injecting of the treatment product comprises at least one step of injecting silicates, when the sanitary water system is not in operation, at a concentration of between 100 and 200,000 milligrams of silicon per litre of water (mg Si/L water) into the water circulating in said circuit for a period of less than 48 hours (h), at a circulating water flow rate in the circuit in a range of between 0.05 and 100 litres per minute (L/min) and at a circulating water temperature in the circuit in a range of between 40 and 65° C.

2. The method according to claim 1, wherein the silicate concentration in the water circulating in said circuit is adjusted between 500 and 50,000 mg Si/L water.

3. The method according to claim 2, wherein the silicate concentration in the water circulating in said circuit is adjusted between 1,000 and 20,000 mg Si/L water.

4. The method according to claim 1, wherein the injection step lasts between 30 minutes and 12 hours.

5. The method according to claim 4, wherein the injection step lasts between 1 hour and 4 hours.

6. The method according to claim 1, wherein the circulating water flow rate in the circuit is adjusted in a range between 0.05 and 10 L/min.

7. The method according to claim 1, wherein the circulating water temperature in the circuit is adjusted in a range between 50 and 60° C.

8. The method according to claim 1, wherein the method comprises at least two treatment product injection steps.

9. The method according to claim 1, further comprising at least one drying step consisting of emptying the water circuit for a period of between 5 minutes and 2 hours, after at least one of the treatment product injection steps.

10. The method according to claim 9, wherein the at least one drying step is performed after each treatment product injection step.

11. The method according to claim 9, wherein the at least one drying step lasts between 10 minutes and 1 hour.

12. The method according to claim 1, wherein the sanitary water circuit comprises a cold water circuit, and the method further comprises a step of interconnecting the cold water circuit with a hot water supply configured to circulate hot water in the cold water circuit during injection of the treatment product.

13. The method according to claim 12, wherein the hot water supply is a hot water circuit, and the interconnecting of the cold water circuit with the hot water circuit circulates hot water in the cold water circuit during injection of the treatment product.

14. The method according to claim 12, wherein the hot water supply is generated by an external water heater.

15. The method according to claim 1, wherein the silicates are in the form of sodium silicates in solution.

16. The method according to claim 1, further comprising a step of cleaning the sanitary water circulation circuit before injecting the treatment product comprising silicates, the cleaning step comprising injecting acid into the sanitary water circulation circuit.

17. The method according to claim 1, further comprising, after the completion of the step of injecting the treatment product comprising silicates into the water circulating in said circuit in order to form a film on the inner surfaces of said circuit, continuously injecting the treatment product comprising silicates in an amount proportional to the volume of water entering the sanitary water circulation circuit, the maximum amount of product injected not exceeding a >alue set by food standards.

* * * * *

UNITED STATES PATENT AND TRADEMARK OFFICE
CERTIFICATE OF CORRECTION

PATENT NO.         : 10,816,221 B2
APPLICATION NO.    : 16/093770
DATED              : October 27, 2020
INVENTOR(S)        : Pierre Descloux Page 1 of 1

It is certified that error appears in the above-identified patent and that said Letters Patent is hereby corrected as shown below:

In the Claims

Column 12, Line 22, replacing the word ">alue" with "value"

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*